(12) United States Patent
Fujimura et al.

(10) Patent No.: US 6,394,486 B1
(45) Date of Patent: May 28, 2002

(54) AIR BAG APPARATUS

(75) Inventors: Yoshiichi Fujimura; Tadahiro Igawa, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/637,707

(22) Filed: Aug. 15, 2000

(30) Foreign Application Priority Data

Aug. 20, 1999 (JP) ............................................. 11-234309
Aug. 4, 2000 (JP) ....................................... 2000-237264

(51) Int. Cl.[7] ............................................. B60R 21/16
(52) U.S. Cl. ............................... 280/728.2; 280/728.3; 280/732
(58) Field of Search .......................... 280/728.1, 728.2, 280/728.3, 732, 731

(56) References Cited

U.S. PATENT DOCUMENTS

| 5,284,358 A | * | 2/1994 | Rhein .......................... 280/743 |
| 5,303,951 A | * | 4/1994 | Goestenkors et al. ..... 280/728.3 |
| 5,346,248 A | | 9/1994 | Rhein et al. |
| 5,354,093 A | * | 10/1994 | Schenck et al. .......... 280/728.3 |
| 5,482,313 A | * | 1/1996 | Ikeya et al. ............... 280/728.2 |
| 5,588,669 A | * | 12/1996 | Leonard et al. .......... 280/728.3 |
| 6,092,833 A | * | 7/2000 | Nariyasu .................. 280/728.2 |

FOREIGN PATENT DOCUMENTS

DE          297 23 034          2/1998

* cited by examiner

Primary Examiner—Brian L. Johnson
Assistant Examiner—Faye M. Fleming
(74) Attorney, Agent, or Firm—Kanesaka & Takeuchi

(57) ABSTRACT

An air bag apparatus is formed of a retainer having an upper opening; an air bag accommodated in the retainer and having a gas inlet, a portion of the air bag around the gas inlet being connected to the retainer; a lid covering the upper opening of the retainer; and a support plate extending from the lid and connected to the retainer. The support plate is deformable in vertical, longitudinal and lateral directions thereby allowing the lid to move relatively in the vertical, longitudinal and lateral directions. The air bag apparatus is light, and the position of the air bag apparatus relative to an instrument panel and the lid can be adjusted easily.

15 Claims, 9 Drawing Sheets

AIR BAG APPARATUS

BACKGROUND OF THE INVENTION AND RELATED ART STATEMENT

The present invention relates to an air bag apparatus installed in a vehicle, and more particularly, to an air bag apparatus that is optimal for a passenger side air bag apparatus.

In a passenger seat air bag apparatus, an air bag is accommodated in a container-like retainer, and the retainer is covered by a lid. The passenger side air bag apparatus is installed in an instrument panel of an automobile. In a collision of the vehicle, an inflator ejects a gas and inflates the air bag. The inflated air bag pushes the lid to open toward a passenger compartment and further expands in the passenger compartment.

There is an air bag apparatus, e.g. Japanese Patent Publication (KOKAI) No. 7-117609, having a lid attached to the retainer to be movable in a direction toward and out of an instrument panel (the direction toward and out of the instrument panel will hereafter be referred to as a vertical direction).

Figure 4:
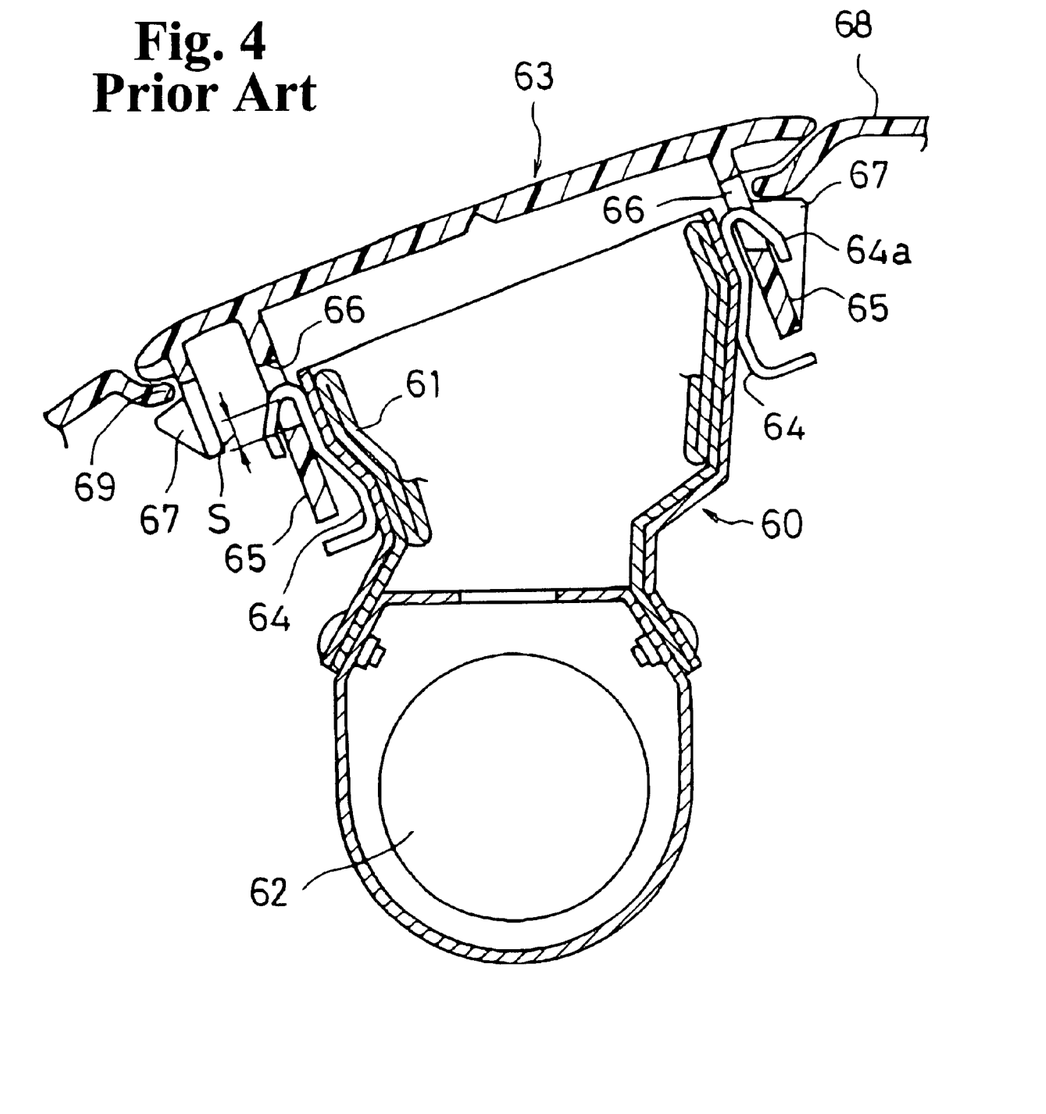
FIG. 4 is a cross sectional view showing a prior art example.

FIG. 4 is a cross-sectional view showing a passenger side air bag apparatus of the publication. An air bag 61 is arranged in a retainer 60. An inflator 62 is arranged below the air bag 61. An opening in the upper surface of the retainer 60 is covered by a lid 63. Metal hooks 64 are welded to the upper side surface of the retainer 60. Hook portions 64a of the metal hooks 64 are located in openings 66 of support plates 65 of the lid 63. The openings 66 are long in the vertical direction. Thus, the lid 63 is movable in the vertical direction in accordance with a gap S between the hook portion 64a and inner end of the opening 66. Engaging pieces 67 provided on the outer surfaces of the support plates 65 hold a portion around an air bag apparatus installation opening 69 in an instrument panel 68 to fix the lid 63 to the instrument panel 68.

In the prior art shown in FIG. 4, the lid 63 is movable only in the vertical direction. Positional adjustment of the lid 63 in a longitudinal direction or a lateral direction is almost impossible. Further, in the prior art of FIG. 4, the metal hooks 64 are needed to connect the lid 63 to the retainer 60, so that the weight of the air bag apparatus is increased for the metal hooks 64.

It is an object of the present invention to provide an air bag apparatus having a lid that is movable relative to a retainer in longitudinal and lateral directions.

It is another object of the present invention to provide an air bag apparatus as stated above, wherein metal hooks are removed from the air bag apparatus to decrease the weight.

Further objects and advantages of the invention will be apparent from the following description of the invention.

SUMMARY OF THE INVENTION

An air bag apparatus according to the present invention includes a container-like retainer having a front opening, and an air bag accommodated in the retainer and provided with a gas inlet. A portion around the gas inlet is connected to the retainer. A lid covers the opening of the retainer, and a support plate extends from the lid. The lid is connected to the retainer. In the air bag apparatus, the support plate is deformable in vertical, longitudinal and lateral directions thereby enabling the lid to move relatively in the vertical, longitudinal and lateral directions.

In the air bag apparatus, the lid is movable in the vertical, longitudinal and lateral directions. Thus, positioning the lid relative to the instrument panel when installing the air bag apparatus in an automobile is very simple. It is preferred that the lid and the support plate are formed integrally from an elastomer.

In the present invention, it is preferable that the retainer is divided into a front half and a rear half, i.e. upper and lower portions, and that a rear end of the front half, a front end of the rear half and an end of the support plate are connected in an overlapped state. This enables the assembly of the retainer and the lid to be performed simultaneously.

In one aspect of the present invention, the front half has a shape of a container and a bottom with an opening. For example, the front half includes the bottom with the opening, and a wall projecting from the periphery of the bottom.

In another aspect of the present invention, the rear half includes a flange overlapping the bottom of the front half, and the bottom of the front half, the flange and the support plate are connected in an overlapped state.

In a further aspect of the present invention, the portion around the gas inlet of the air bag is connected to the bottom of the front half. For example, the surrounding portion is superposed with a portion around the opening of the bottom, and a contact plate is superimposed thereon. The bottom, the portion of the air bag around the gas inlet portion, and the support plate are held between the contact plate and the flange.

The contact plate may have a frame-like shape so that it surrounds the opening of the bottom. Further, bolts are fixed to the contact frame. The bolts are inserted through the air bag, the bottom, the support plate and the flange, and are fastened by nuts to connect the air bag and the support plate to the bottom.

In a still further aspect of the present invention, a projection projects outwardly around the opening of the bottom, and the projection is engaged with a front portion of the rear half.

In the air bag apparatus according to the present invention, the front half may be made of a synthetic resin. This decreases the weight of the air bag apparatus. By forming the rear half from metal, impact against the instrument panel is absorbed.

In the present invention, it is preferable that a rear side of a peripheral portion of the lid engages a portion surrounding an air bag installation opening of the instrument panel.

In the present invention, the lid may be formed integrally with the instrument panel.

In a still further aspect of the present invention, the lid includes a main body for covering the opening of the retainer, a wall projecting from the main body to surround the front end of the retainer, and the support plate extending from the wall. In this case, by making the thickness of the support plate less than the thickness of the wall, deformation of the support plate is facilitated and movement of the lid is made easily.

In the present invention, the support plate has holes to facilitate deformation of the support plate and ease movement of the lid.

DETAILED DESCRIPTION OF PREFERRED EMBODIMENTS

Embodiments according to the present invention will now be described with reference to the drawings.

Figure 1:
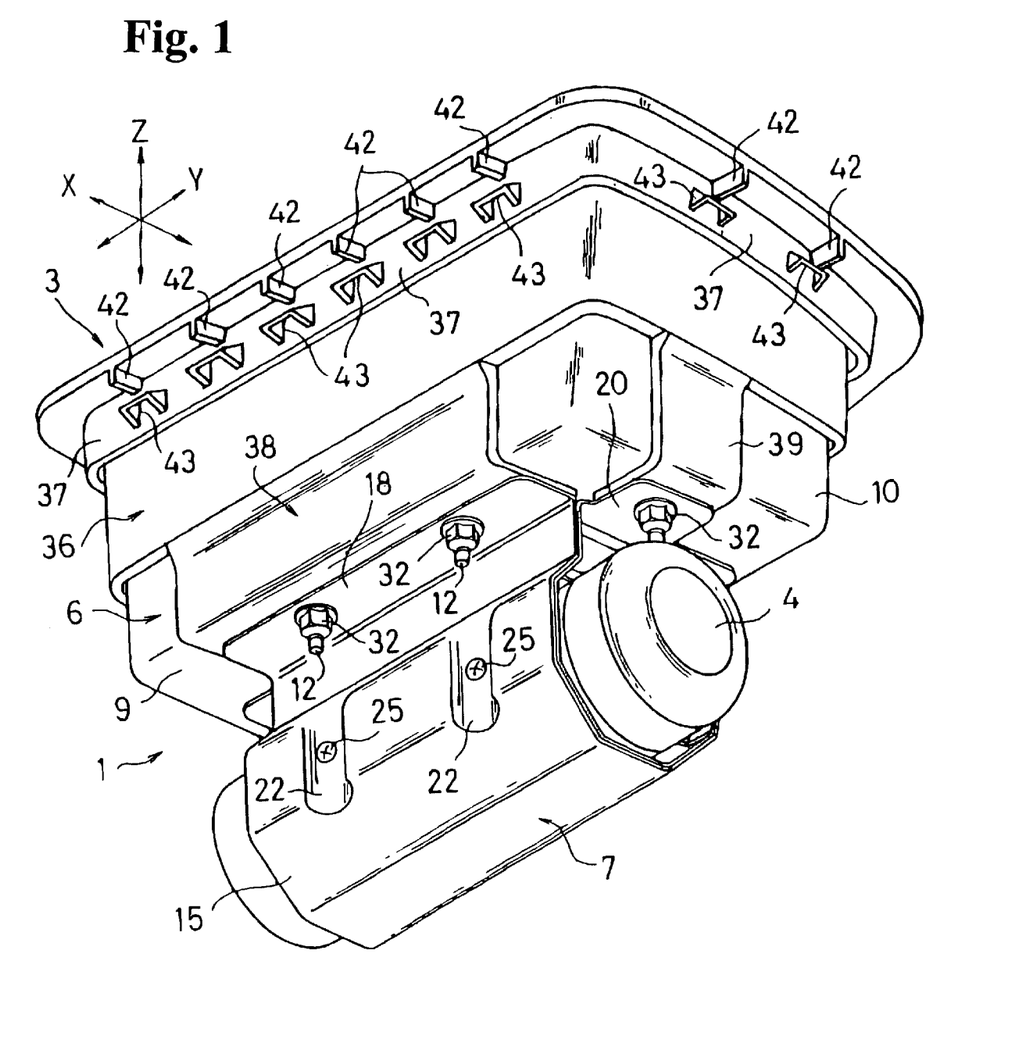
FIG. 1 is a perspective view from a lower side for showing an air bag apparatus according to the invention.
Figure 2:
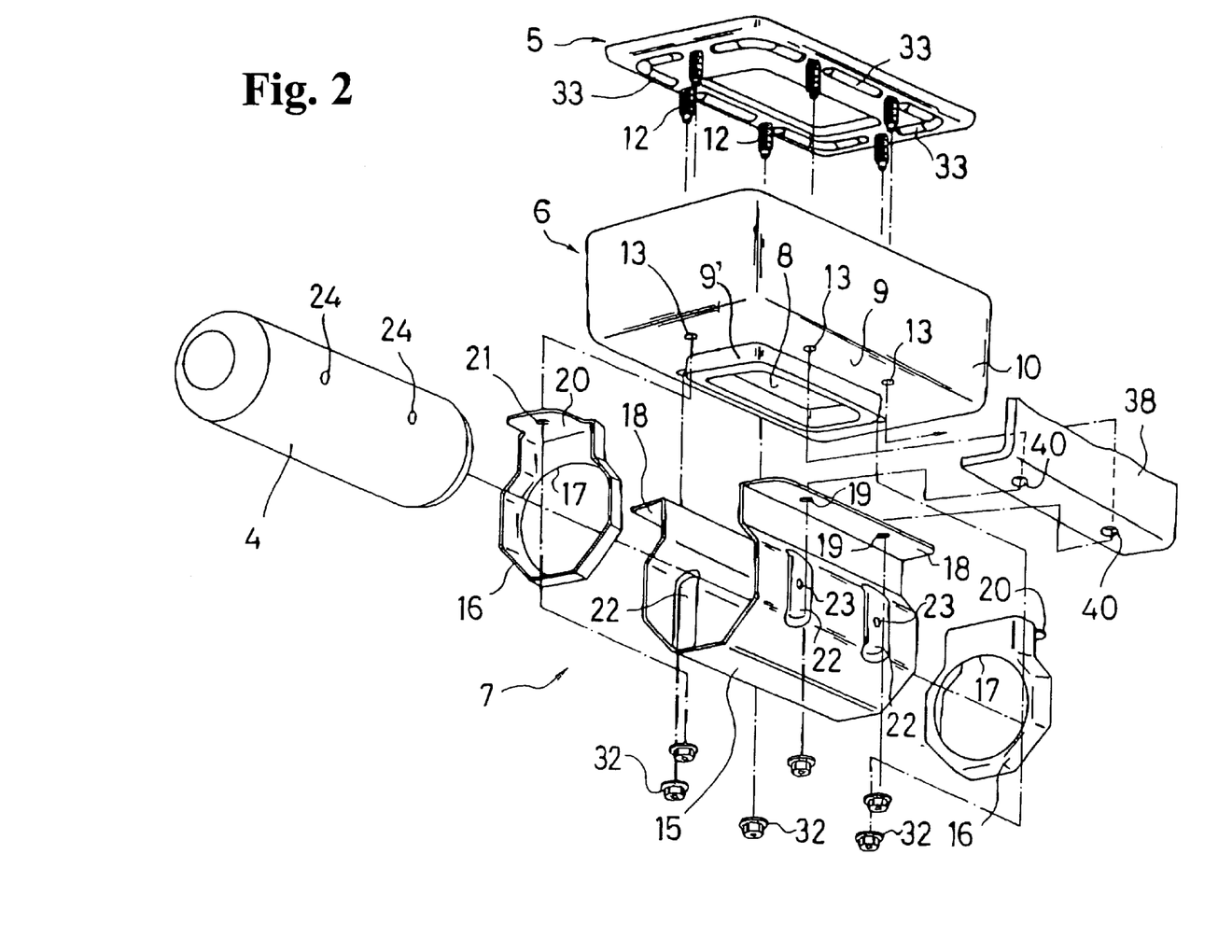
FIG. 2 is an exploded perspective view showing the air bag apparatus.
Figure 3:
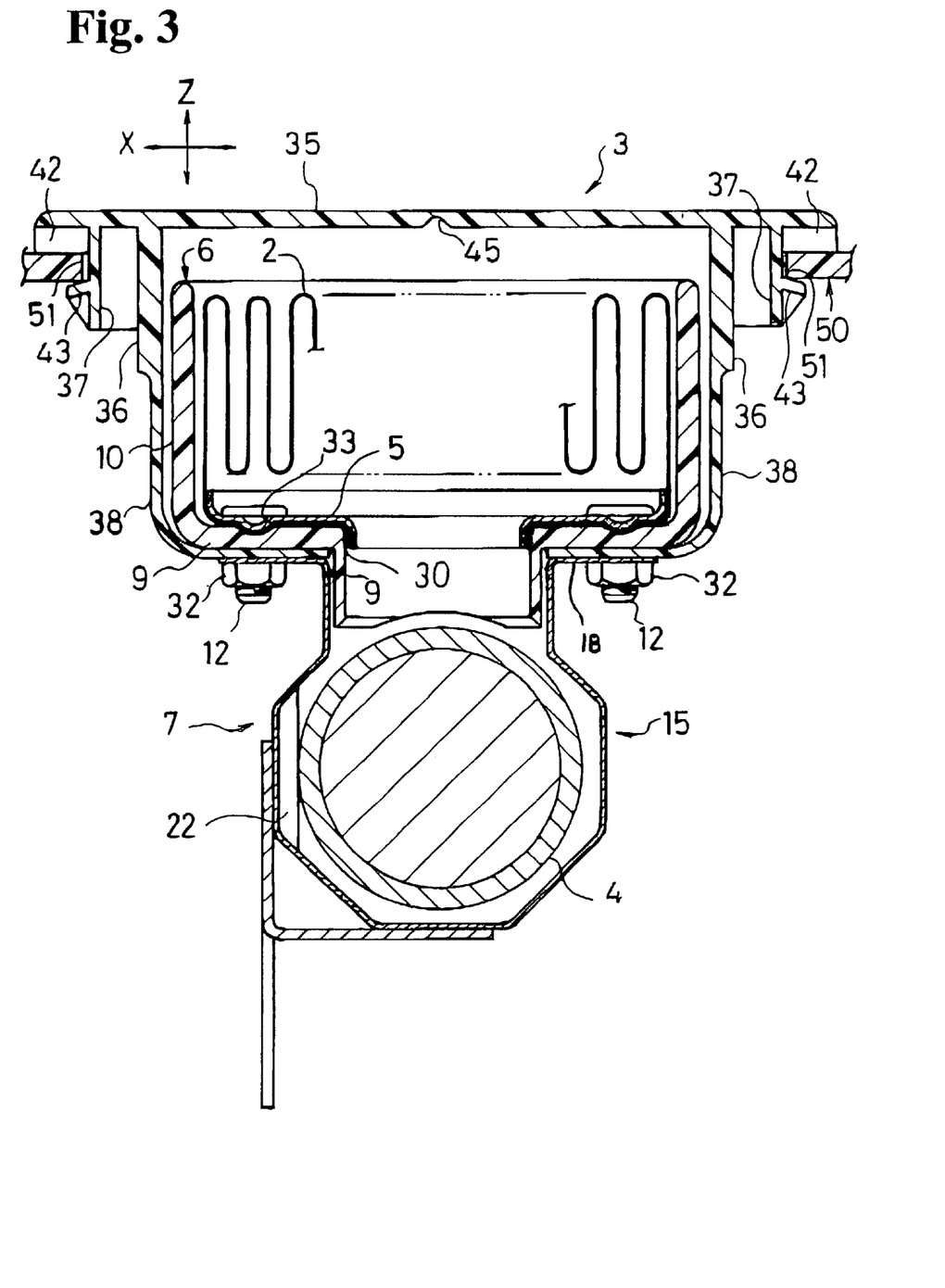
FIG. 3 is a cross sectional view showing an air bag apparatus according to the invention.

FIG. 1 is a perspective view from a lower side for showing an air bag apparatus of the embodiment; FIG. 2 is an exploded perspective view of the air bag apparatus; and FIG. 3 is a cross sectional view of the air bag apparatus. An air bag is not shown in FIG. 2. In this embodiment, a vertical direction refers to directions toward and out of an instrumental panel, i.e. a Z axis direction of FIGS. 1 and 3, a longitudinal direction refers to forward and rearward directions of a vehicle, i.e. an X axis direction of FIGS. 1 and 3, and a lateral direction refers to left and right directions of the vehicle, i.e. a Y axis direction of FIG. 1. The Y axis direction is a direction perpendicular to the plane of FIG. 3.

The air bag apparatus includes a retainer 1, an air bag 2, which is accommodated in the retainer 1 in a folded state, a lid 3 covering a front opening of the retainer 2, an inflator (gas generator) 4, which inflates the air bag 2, and a contact plate 5 (pressing frame), which secures the air bag 2 to the retainer 1. In this embodiment, the retainer 1 is longer in the lateral direction of the vehicle and shorter in the longitudinal direction of the vehicle. The retainer 1 is a container with an opening at its upper end. The upper opening is rectangular.

The retainer 1 is formed of a front or upper half, i.e. upper retainer part 6, which is made of a synthetic resin, and a rear or lower half, i.e. lower retainer part 7, which is made of metal.

The upper retainer part 6 includes a rectangular bottom 9, which has a rectangular opening 8, and a tetragonal wall 10, which extends continuously from the sides of the bottom 9. Holes 13, through which bolts 12 are inserted, extend through the bottom 9 around the opening 8. The bolts 12 are fixed to the pressing frame 5.

The upper retainer part 6 has a projection 9' projecting from the bottom 9 around the opening 8. The projection 9' is fitted into the upper end of the lower retainer part 7 made of metal to reinforce the force coupling the lower retainer part 7 to the upper retainer part 6.

The lower retainer part 7 includes a main body 15 having a Ω-like cross section in a direction extending perpendicular to the longitudinal direction, and a pair of side walls 16, which are fitted into the sides of the main body 15 and fixed thereto by spot welding or crimping the side walls 16. Circular holes 17, through which the inflator 4 is inserted, are formed in the side walls 16.

The main body 15 has a pair of flanges 18, which are superposed with the outer surface of the bottom 9 of the upper retainer part 6. Holes 19 are provided in the flanges 18 for inserting the bolts 12. The side walls 16 also have flanges 20 superposed with the outer surface of the bottom 9 of the upper retainer part 6. Bolt insertion holes 21 are provided in the flanges 20.

Ribs 22 extend inward from the side surfaces of the main body 15. Holes 23, through which screws 25 are inserted, are provided in the ribs 22. The inflator 4 has screw holes 24 into which the screws 25 are screwed.

The lid 3 includes a main body 35, which covers the upper retainer part 6 from above, a tetragonal first wall 36 and second wall 37 extending from the main body 35, and thin and bendable support plates 38, 39 extending from the wall 36. Each of the support plates 38, 39 is bent, and has a lower portion extending below the upper retainer part 6. The support plates 38, 39 have insertion holes 40 (FIG. 2) for the bolts 12. The support plates 38 extend from the bottoms of the long sides of the first wall 36, and the support plates 39 extend from the bottoms of the short sides of the first wall 36.

The first wall 36 has a shape and dimension to allow the upper retainer part 6 to be fitted therein. The second wall 37 is located outside the first wall 36. The vertical length of the second wall 37 is shorter than the vertical length of the first wall 36. Engaging pieces 42, 43 are provided on the outer surface of the second wall 37 to engage a portion around an installation opening 51 in an instrument panel 50.

The upper engaging pieces 42 have rib-like shapes and project from the portion where the main body 35 and the second wall 37 intersect. Further, the upper engaging pieces 42 contact the portion around the opening 51 from above. The lower engaging pieces 43 are slightly inclined toward distal portions and contact the portion around the opening 51 from below. The portion around the opening 51 is held between the pair of the engaging pieces 42, 43. The lid 3 has a tear line 45 (FIG. 3), which is torn when the air bag 2 is inflated.

After the air bag 2 is folded and accommodated in the upper retainer part 6, the lid 3 is attached to the upper retainer part 6.

The portion around a gas inlet 30 (FIG. 3) of the air bag 2 is disposed on the bottom 9 of the upper retainer part 6, and the pressing frames 5 is superposed thereabove. The bolts 12 projecting from the pressing frame 5 are inserted through the bolt insertion holes 31 of the air bag 2, the bolt insertion holes 13 of the bottom 9, the bolt insertion holes 40 of the support plates 38 or 39, and the bolt insertion holes 19 or 21 of the respective flanges 18 or 20. Nuts 32 are then fastened to the bolts 12.

As shown in FIG. 3, projections 33 project from the lower surface of the pressing frame 5, and receptacles for receiving the projections 33 are formed on the upper surface of the bottom 9 of the upper retainer part 6. When the nuts 32 are fastened to the bolts 12, the projections 33 enter the receptacles, and the air bag 2 enters the receptacles. This significantly strengthens the connection between the air bag 2 and the upper retainer part 6.

The air bag apparatus is installed in the instrument panel of an automobile. The lid 3 of the air bag apparatus is connected to the retainer 1 by the bendable support plates 38, 39 and is movable vertically, longitudinally and laterally. Thus, even if there is a slight error between the air bag apparatus and the opening 51 of the instrument panel 50, the error can be absorbed to fit appropriately the lid 3 into the opening.

When a passenger hits the air bag apparatus installed in the instrument panel, in addition to deformation of the synthetic resin upper retainer part 6, the metal lower retainer part 7 is deformed to absorb the energy of the impact. Especially, since the main body 15 of the lower retainer part 7 has a generally Ω-like cross section, the lower retainer part 7 is apt to deform when an impact is applied from above and absorbs a large amount of the impact energy.

Since the air bag apparatus of the invention does not use the conventional metal hooks, the apparatus is light. Further, since the upper retainer part 6 is made of a synthetic resin, the air bag apparatus is lighter than one using a retainer entirely made of metal.

When the inflator 4 ejects a gas in an emergency state, such as in collision of the vehicle, the gas inflates the air bag 2 thereby tearing the lid 3 along the tear line 45 and inflates the air bag 2 in the passenger compartment.

Figure 5:
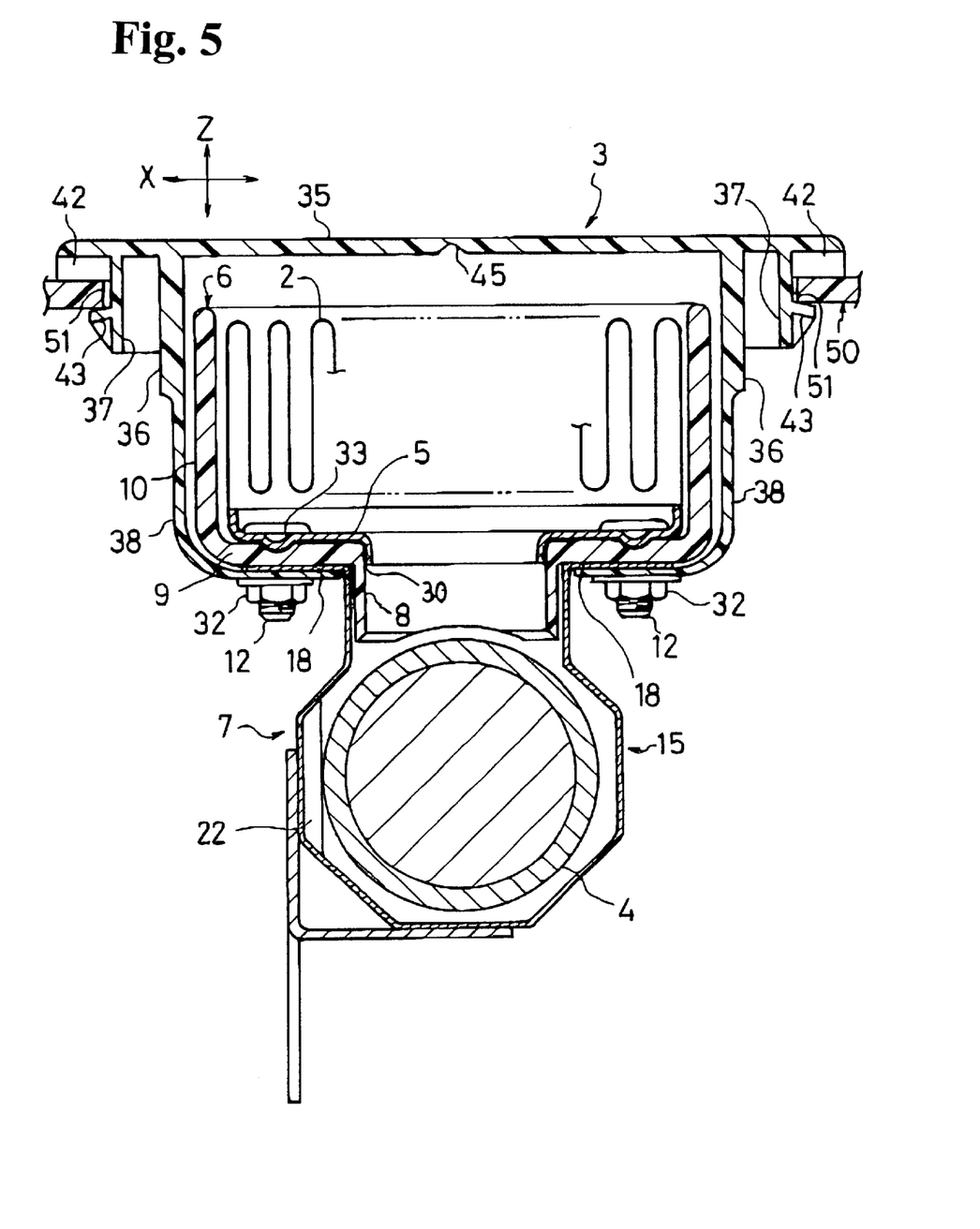
FIG. 5 is a cross sectional view showing an air bag apparatus according to another embodiment.

In an embodiment as shown in FIG. 5, support plates 38 are overlapped with the flanges 18 of the main body 15 from the lower side. In other words, the flanges 18 are overlapped with the lower surface of the bottom of the upper retainer part 6, and the support plates 38 are overlapped with the lower surfaces of the flanges 18. These members are then connected and fastened by the bolts 12 and nuts 32.

Figure 6A:
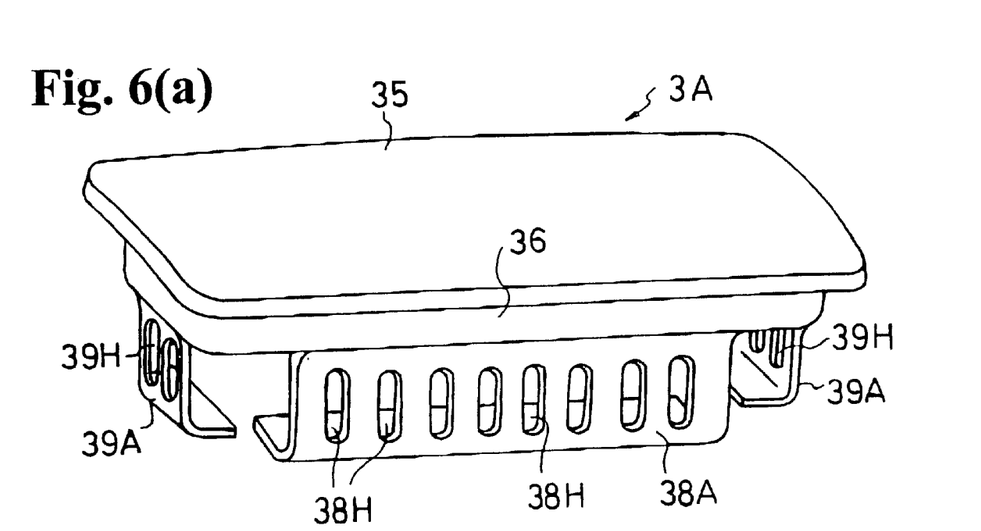
FIG. 6(a) is a perspective view showing a lid of an air bag apparatus according to a further embodiment.
Figure 6B:
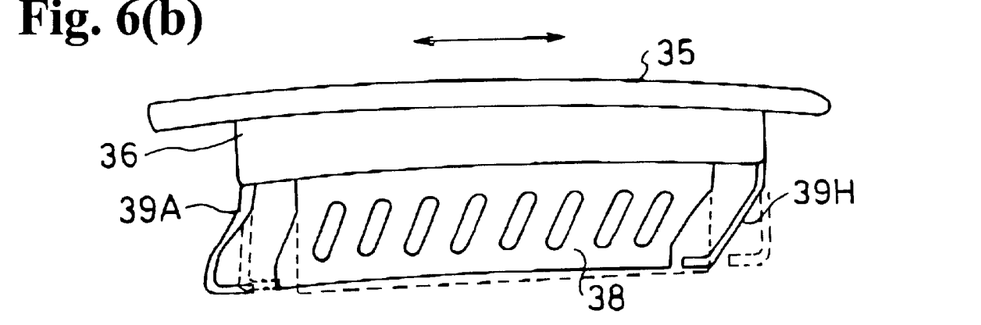
FIG. 6(b) is a front view of the lid.
Figure 6C:
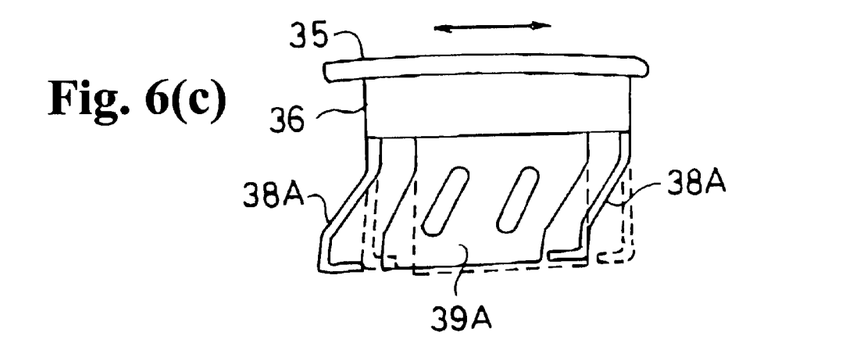
FIG. 6(c) is a side view of the lid.

In an embodiment as shown in FIG. 6(a), a lid 3A is provided with support plates 38A and 39A having holes 38H and 39H respectively. In this structure, the support plates 38A and 39A may be deformed further easily, to facilitate movement of the main body 35 of the lid 3A in the directions shown by the arrows in FIGS. 6(b) and 6(c).

Figure 7A:
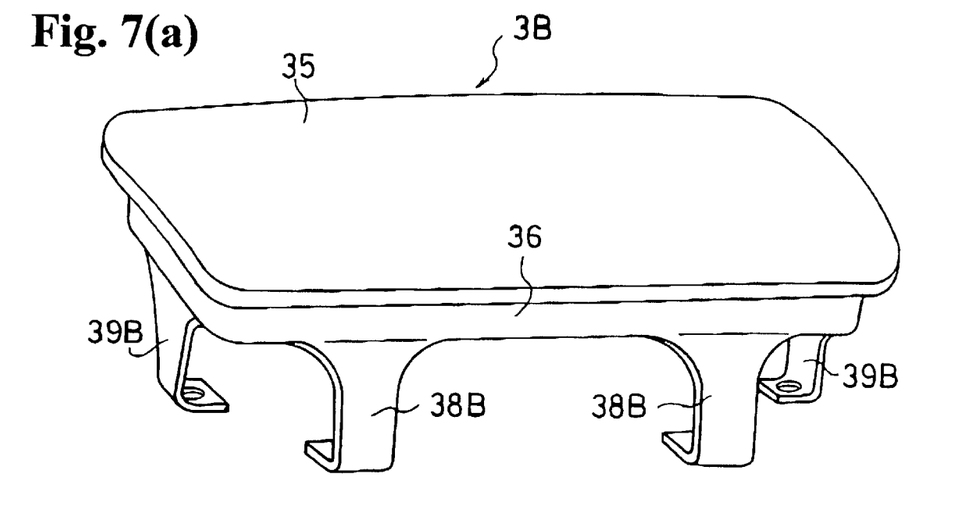
FIG. 7(a) is a perspective view showing a lid of an air bag apparatus according to a still further embodiment.
Figure 7B:
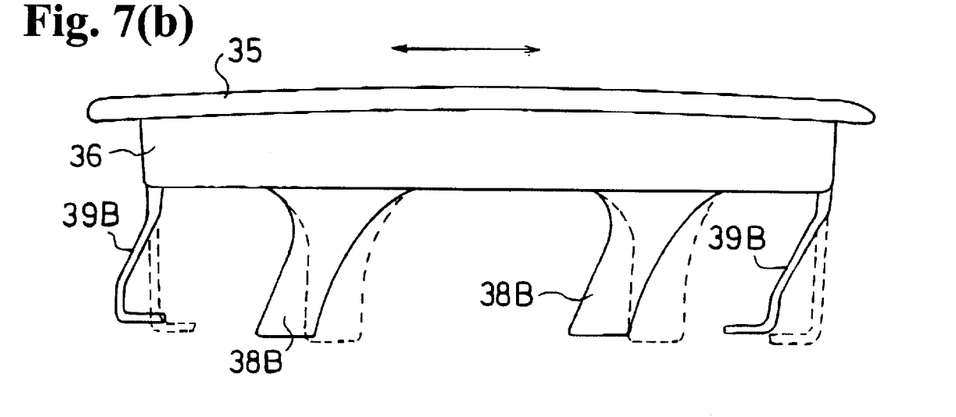
FIG. 7(b) is a front view of the lid.
Figure 7C:
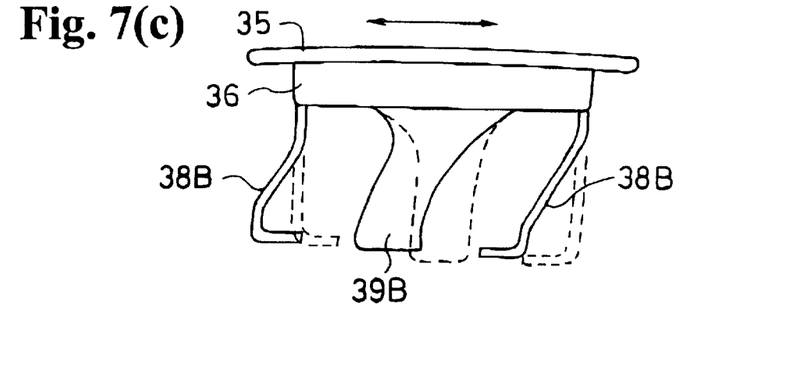
FIG. 7(c) is a side view of the lid.

In an embodiment as shown in FIG. (a), a lid 3B has narrow support plates 38B and 39B. The narrow support plates 38B and 39B deform easily, thereby facilitating movements of the lid main body 35 in the directions shown by the arrows in FIGS. 7(b) and 7(c).

Figure 8:
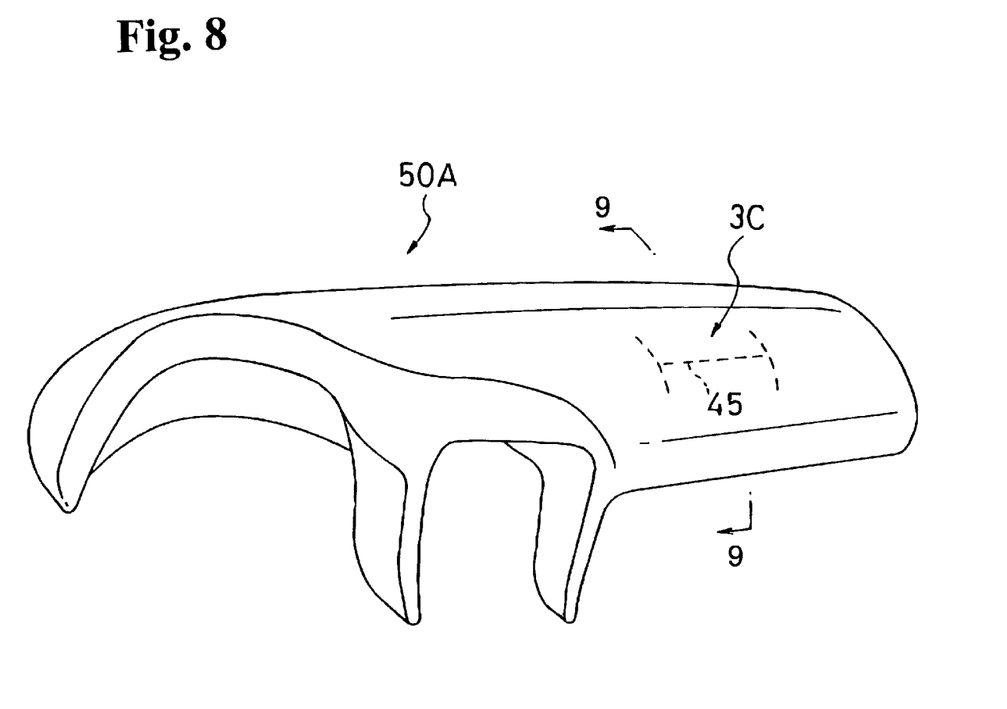
FIG. 8 is a perspective view showing an instrument panel of an air bag apparatus according to a still further embodiment.
Figure 9:
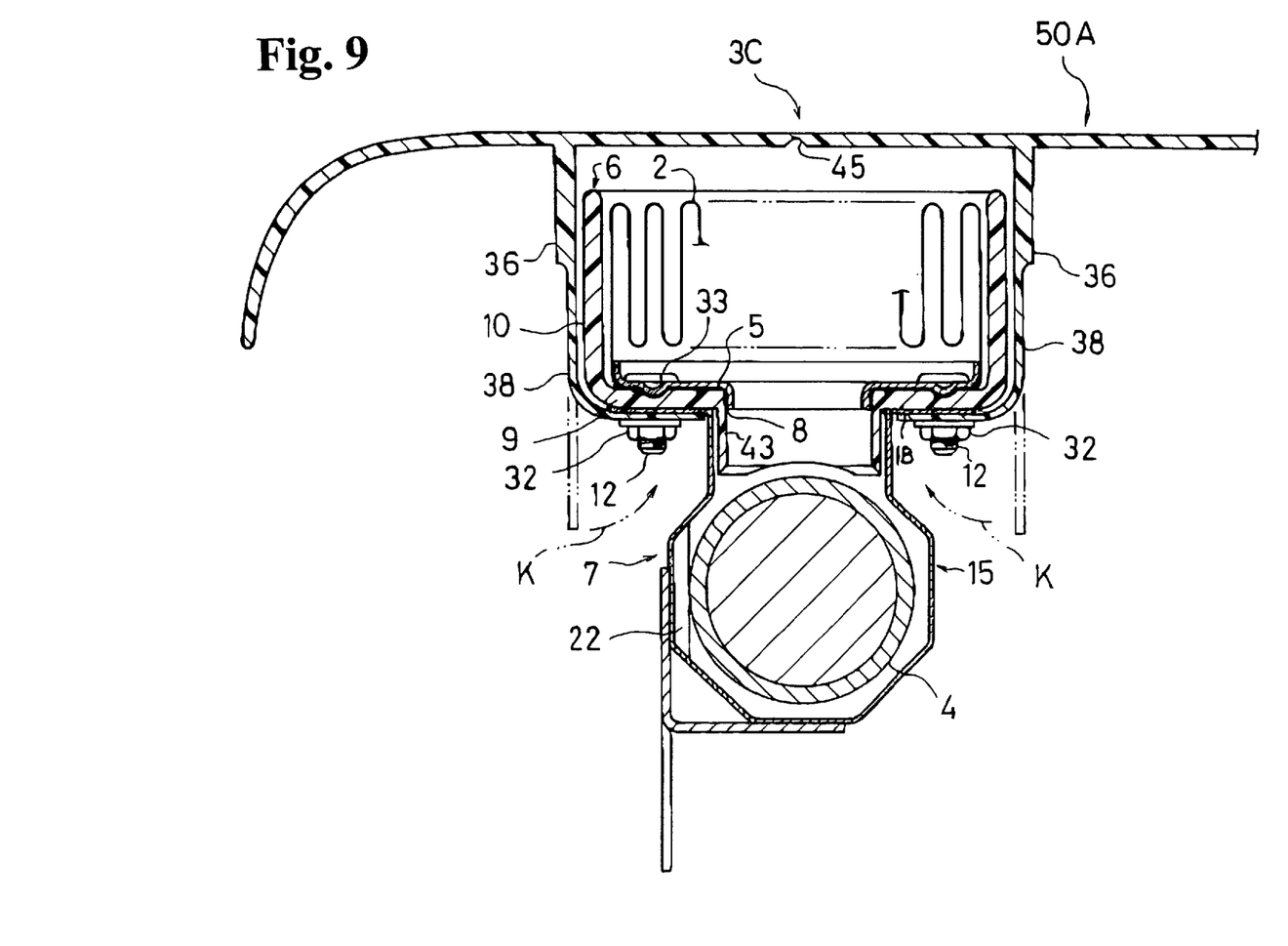
FIG. 9 is a cross sectional view taken along line 9—9 in FIG. 8.

In an embodiment as shown in FIGS. 8 and 9, a lid and an instrument panel are formed integrally. An instrument panel 50A includes a lid portion 3C. The lid portion 3C is formed continuously from and integrally with the instrument panel 50A. The lid portion 3C has a tear line 45, and extends continuously with a wall 36. The remaining structure in FIG. 9 is identical to that of FIG. 5, and the same reference numerals show the same portions.

Support plates 38 and 39 (39 is not shown in FIG. 9), which are continuous with the wall 36, are bent in the direction shown by arrows K in FIG. 9 to overlap the lower surfaces of the flanges 18 and 20 (20 is not shown in FIG. 9) in the same manner as shown in FIG. 5, and are connected to the bottom 9 of the upper retainer part 6 by bolts 12 and nuts 32 together with the flanges 18 and 20. However, they may be held between the bottom 9 of the upper retainer part 6 and the flanges 18 and 20 as shown in FIGS. 1 to 3.

In the present invention, the thickness of the support plate may be made greater than or equal to the thickness of the wall.

As described above, in the air bag apparatus according to the present invention, the lid is movable vertically, longitudinally and laterally relative to the retainer. Thus, the positioning of the lid relative to the air bag apparatus installation opening is facilitated. Further, since metal hooks used in the prior art are not used, the air bag apparatus is light.

While the invention has been explained with reference to the specific embodiments of the invention, the explanation is illustrative and the invention is limited only by the appended claims.

What is claimed is:

1. An air bag apparatus comprising:
   a retainer including an upper part having an upper opening and a lower portion, and a lower part with an upper portion, said lower portion and said upper portion being overlapped and connected together;
   an air bag accommodated in the retainer and having a gas inlet, and an edge portion around the gas inlet connected to the retainer;
   a lid covering the upper opening of the retainer;
   a wall extending from the lid to surround the retainer; and
   a support plate extending from the wall and located under the lower portion of the retainer, said support plate being connected to the retainer at the lower portion and being deformable in vertical, longitudinal and lateral directions thereby allowing the lid to move relatively in the vertical, longitudinal and lateral directions.

2. An air bag apparatus according to claim 1, wherein said lid and said support plate are formed integrally from an elastomer.

3. An air bag apparatus according to claim 1, wherein said upper part includes a surrounding wall and a bottom with an opening, and the lower part includes a flange overlapping the bottom, said bottom of the upper part, the flange of the lower part and the support plate being overlapped and connected together.

4. An air bag apparatus according to claim 3, further comprising a contact plate, said edge portion around the gas inlet of the air bag being disposed on the bottom of the upper part around the opening, and said contact plate and the flange sandwiching therebetween the bottom, the edge portion of the air bag around the gas inlet and the support plate.

5. An air bag apparatus according to claim 3, wherein said upper part includes a projection projecting downwardly from an edge of the opening of the bottom, said projection engaging the upper portion of the lower part.

6. An air bag apparatus according to claim 1, wherein said upper part is made of a synthetic resin, and the lower part is made of metal.

7. An air bag apparatus according to claim 1, wherein said lid includes engaging pieces provided on a rear side of a peripheral portion thereof to engage a portion of an instrument panel around an air bag installation opening.

8. An air bag apparatus according to claim 1, wherein said lid is formed integrally with an instrument panel.

9. An air bag apparatus according to claim 1, wherein said lid includes a main body for covering the upper opening of the retainer, said wall projecting from the main body to surround the upper part of the retainer.

10. An air bag apparatus according to claim 9, wherein said support plate has a thickness less than that of the wall.

11. An air bag apparatus according to claim 1, wherein said support plate includes a plurality of support plate portions laterally spaced apart from each other and extending from the wall.

12. An air bag apparatus comprising:
   a retainer including an upper part having an upper opening, a surrounding wall around the upper opening, and a lower portion with a bottom with an opening; and a lower part having an upper portion with a flange overlapping the bottom, said lower portion and said upper portion being overlapped and connected together;
   an air bag accommodated in the retainer and having a gas inlet and an edge portion around the gas inlet connected to the retainer, said edge portion of the air bag being disposed on the bottom of the upper part around the opening;
   a lid covering the upper opening of the retainer;
   a support plate extending from the lid, said support plate, bottom of the upper part and flange of the lower part being overlapped and connected together, said support plate being deformable in vertical, longitudinal and lateral directions thereby allowing the lid to move relatively in the vertical, longitudinal and lateral directions; and a contact plate disposed in the retainer, said contact plate and the flange sandwiching therebetween the bottom, the edge portion of the air bag and the support plate.

13. An air bag apparatus according to claim 12, wherein said contact plate is a frame surrounding the opening of the bottom of the upper part, and includes bolts fixed thereto, said bolts being inserted through the air bag, the bottom of the upper part, the support plate, and the flange and fastened by nuts.

14. An air bag apparatus comprising:

a retainer having an upper opening;

an air bag accommodated in the retainer and having a gas inlet and an edge portion around the gas inlet connected to the retainer;

a lid covering the upper opening of the retainer; and a support plate extending from the lid and connected to the retainer, said support plate having a plurality of elongated through holes extending in a direction substantially perpendicular to the lid without engaging other members, said elongated through holes providing flexibility and allowing the support plate to be deformable in vertical, longitudinal and lateral directions thereby allowing the lid to move relatively in the vertical, longitudinal and lateral directions.

15. An air bag apparatus according to claim 14, wherein said support plate includes a lower portion located below the elongated through holes, said lower portion being connected to the retainer together with the air bag.

* * * * *